Patented Sept. 14, 1954

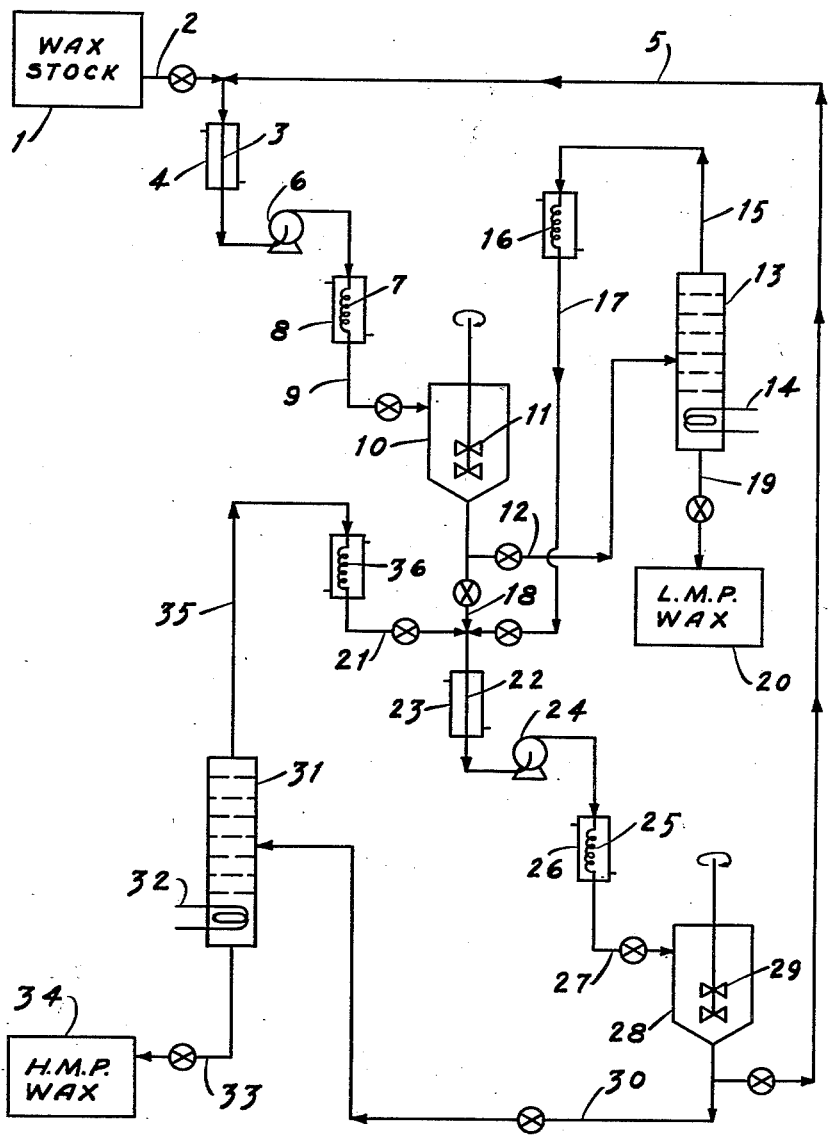

2,689,206

UNITED STATES PATENT OFFICE 2,689,206

SOLVENT REFINING OF WAX-CONTAINING MIXTURES

Edgar W. Clarke, Laurel Springs, N. J., assignor to The Atlantic Refining Company, Philadelphia, Pa., a corporation of Pennsylvania Application February 23, 1951, Serial No. 212,289

The portion of the term of the patent subsequent to July 17, 1968, has been disclaimed and dedicated to the public 2 Claims. (Cl. 196—17)

The present invention relates to the treatment of oily waxes, and more particularly to the separation of wax-containing mixtures into fractions of higher and lower melting point.

This invention is especially applicable to the deoiling of hydrocarbon waxes containing not more than 70% of oil, and to the separation of wax mixtures of low oil content into fractions of different melting point.

This application is a continuation-in-part of copending application Serial No. 779,922, filed October 15, 1947, now U. S. Patent No. 2,561,096, and entitled "Solvent Refining of Wax-Containing Mixtures."

In accordance with the invention, a wax-containing mixture is separated into fractions of higher and lower melting point by admixing the wax-containing mixture with pyridine as the selective solvent at a temperature above the cloud point of the admixture, cooling the admixture to a temperature below the cloud point such that two immiscible liquid phases are formed, one phase comprising a major portion of the higher melting wax in the form of finely divided particles suspended in a minor portion of the solvent, and the second phase comprising a major portion of the solvent containing dissolved lower melting wax, oil, and color bodies, separating the phases from one another, and removing the solvent from each. The quantity of solvent employed will usually range from 3 to 5 volumes per volume of wax-containing mixture to be treated, although in some cases as little as 1.5 volumes of solvent may be used. The cloud point will depend upon the nature of the wax-containing mixture, as well as upon the composition and volume of solvent used. The temperature of the initial heating must be above the cloud point, and may be above the miscibility temperature of the admixture. The cooling is preferably carried to a temperature between 1° F. and 5° F. below the cloud point, in order that the higher melting wax may crystallize and form a suspension of finely divided particles in the immiscible liquid phase. This suspension is characterized as being non-filterable due to the fineness of the particles, but is flowable. By effecting separation of the wax at a temperature just below the cloud point, it is possible to avoid the use of filters and their attendant difficulties, on the one hand, and likewise to avoid the loss of selectivity of the solvent encountered in operating at a temperature above the cloud point but below miscibility temperature, on the other hand.

The process of the present invention may be applied in the refining, purification, or separation of wax stocks such as petroleum slack wax, crude microcrystalline wax, paraffin waxes, petrolatum wax, montan wax, ceresin, ozokerite, waxes from the distructive or non-destructive hydrogenation of mineral oil, synthetic hydrocarbon oil, shale oil, coal, and waxes produced synthetically by the catalytic reaction of hydrocarbons, or waxes derived from the modified Fischer-Tropsch reaction of carbon monoxide and hydrogen.

The present invention may be further understood with reference to the accompanying drawing which represents diagrammatically a 2-stage system suitable for carrying out the process.

Referring to the drawing, the wax stock in a molten condition is delivered from a storage vessel 1 through valve-controlled pipe 2 to pipe 3 surrounded by a heating jacket 4 through which steam or other medium may be circulated to maintain the desired temperature. A hot solvent extract, pyridine, containing lower melting wax, oil, and possibly color bodies, is simultaneously supplied to pipe 3 through pipe 5, the source of such solvent extract being described in detail hereinafter. In passing through jacketed pipe 3, the temperature of the wax stock and solvent extract is adjusted to a value above the cloud point of the admixture, and if desired, such temperature may be raised to or above the miscibility temperature of the admixture. The cloud point may be considered that temperature at which the higher melting wax appears as a suspension of finely divided solid particles, such particles being substantially non-filterable. In general, the temperature of the admixture at this stage should be from 5° F. to 30° F. above the cloud point. The admixture, at a temperature above its cloud point, is thoroughly agitated in its passage through pump 6, and is delivered by such pump to a cooling coil 7 or other suitable device for decreasing the temperature. Coil 7 is surrounded by jacket 8 through which brine, water, or other cooling medium may be circulated. In passing through coil 7, the temperature of the admixture is reduced to a value below its cloud point, preferably from 1° F. to 5° F. below the cloud point. As a result of the cooling, two immiscible liquid phases are formed, if not already in existence, the higher melting wax components being distributed as finely divided, non-filterable particles throughout the phases. This mixture is passed from coil 7 through valve-controlled pipe 9 into settling vessel 10 provided with a rotatable stirrer 11, which, if desired, may also function as a scraping device for loosening wax which may adhere to the walls of the vessel. In vessel 10, the mixture is permitted to settle and stratify into two layers, the upper layer comprising for the most part the higher melting wax particles and a minor amount of solvent, for example, 5% to 20% by volume of the upper layer. The lower layer comprises the major portion of the solvent in which is dissolved the lower melting wax, oil, and color bodies (if present). A small amount of finely divided higher melting wax particles may also be entrained in the lower layer, due to failure to pass upwardly from the extract solution into the upper layer comprising the higher melting wax particles. The lower layer is then drawn from settling vessel 10 and is passed through valve-controlled pipe 12 into a fractionating or stripping tower 13 provided with a heating coil 14. In tower 13, the solvent is removed from the lower melting wax by vaporization, the solvent vapors being taken overhead through pipe 15, condensed in condenser 16, and delivered by valve-controlled pipe 17 to valve-controlled pipe 18 for further use, as will be described. The lower melting wax is drawn from the bottom of tower 13 and passed by valve-controlled pipe 19 into storage vessel 20.

The upper layer contained in settling vessel 10, comprising the major portion of the higher melting wax in the form of finely divided particles suspended in a minor portion of the solvent, is slowly agitated by rotation of stirrer 11, and is drawn from vessel 10 through valve-controlled pipe 18 and is commingled therein with solvent from valve-controlled pipe 17, as well as with solvent delivered by valve-controlled pipe 21, the source of which will be hereinafter described. The resulting admixture of finely divided higher melting wax and solvent is passed through pipe 22 surrounded by heating jacket 23, and the temperature of the admixture is brought to a value above the cloud point, and if desired, above the miscibility temperature. The heated mixture is then delivered by pump 24, with thorough agitation, to cooling coil 25 surrounded by jacket 26 through which a cooling medium may be circulated. The temperature of the mixture is reduced to a level a few degrees below its cloud point (1° F. to 5° F.), and the mixture is then delivered by valve-controlled pipe 27 to settling vessel 28 provided with stirrer 29. Herein, the immiscible liquid phases are permitted to settle and stratify, and there is produced an upper layer comprising a major portion of the higher melting wax in the form of a fine suspension in a minor amount of solvent, the wax being relatively light colored and of much reduced oil content. The lower layer comprises the major portion of the solvent with minor amounts of lower melting wax, oil, and color bodies, if present. The lower layer is withdrawn from vessel 28 and is recycled by means of valve-controlled pipe 5 to pipe 3 for use as explained hereinbefore.

The upper layer contained in vessel 28 is slowly agitated by stirrer 29, and is passed by valve-controlled pipe 30 to the fractionating or stripping tower 31, provided with heating coil 32. In tower 31, the solvent is separated from the higher melting wax by distillation, the wax being withdrawn from the bottom of the tower via valve-controlled pipe 33 and passed to storage vessel 34. The solvent is taken overhead as vapor through pipe 35, condensed in condenser 36, and delivered by valve-controlled pipe 21 to pipe 18 for further use as described hereinbefore.

While the invention has been particularly described with respect to the operation of a 2-stage system, it is obvious that it may likewise be carried out in a system of any desired number of stages, depending upon the degree of separation of the wax-containing mixture required. Preference is had for a system containing from 3 to 5 stages in order to obbtain the most effective separation of the higher and lower melting point waxes.

The present invention may be further illustrated by the following examples, which, however, are not to be construed as limiting the scope thereof.

(1) A slack wax of brown color having a melting point of 113° F. and an oil content of 41.3% by weight was extracted with pyridine in a three-stage system operated in the manner described with reference to the system shown in the drawing. The volume ratio of pyridine to wax stock was 4.5 to 1 and the extraction temperature in the first stage was 75° F. and in the second and third stages 80° F. In the table which follows, a comparison is made between the properties of the charge stock together with the properties of the raffinate and extract phases from the process.

|  | Charge Stock | Raffinate | Extract |
|---|---|---|---|
| Percent Yield by Weight | 100 | 35.7 | 64.3. |
| Melting Point, ° F | 113.1 | 132.1 | 102.4. |
| Percent Oil Content by Weight. | 41.3 | 2.6 | 49.8. |
| Refractive Index at 176° F | 1.4415 | 1.4298 | 1.4496. |
| Color | Brown | White | Brown. |
| Firmness | Nil | Good | Nil. |
| Tackiness | Poor | do | do |
| Plasticity | Too soft | Moderate | Too soft. |
| Fiber Length | Short | Long | Short. |
| Flexibility | Poor | Moderate |  |

(2) A slack wax brown color having a melting point of 113° F. and an oil content of 24.2% by weight was extracted in accordance with the present invention in a single stage system using pyridine as the solvent at a temperature of 104° F. The volume ratio of solvent to wax stock was 3.28 to 1. In the table which follows, a comparison is made between the properties of the charge stock together with the properties of the raffinate and extract phases from the process.

|  | Charge Stock | Raffinate | Extract |
|---|---|---|---|
| Percent Yield by Weight | 100 | 11.1 | 88.9. |
| Melting Point, ° F | 113.1 | 131.3 | 110.7. |
| Percent Oil Content by Weight. | 24.2 | 12.7 | 22.9. |
| Refractive Index at 176° F | 1.43625 | 1.43402 | 1.43600. |
| Color | Brown | White | Brown. |

I claim:

1. The method of separating a wax-containing mixture into fractions of higher and lower melting point, which comprises admixing said wax-containing mixture with from 3 to 5 volumes of pyridine at a temperature above the cloud point of the admixture, cooling the admixture to a temperature of 1° F. to 5° F. below the cloud point such that two immiscible liquid phases are formed, one phase comprising a major portion of the higher melting wax in the form of finely divided, unfilterable particles suspended in a minor portion of the pyridine, and the second phase comprising a major portion of the pyridine containing dissolved lower melting wax, oil and color bodies, separating the phases from one another, and removing the pyridine from each.

2. The method of separating a wax-containing mixture into fractions of higher and lower melting point, which comprises admixing said wax-containing mixture with from 3 to 5 volumes of pyridine at a temperature of 5° F. to 30° F. above the cloud point of the admixture, cooling the admixture to a temperature of 1° F. to 5° F. below the cloud point such that two immiscible liquid phases are formed, one phase comprising a major portion of the higher melting wax in the form of finely divided, unfilterable particles suspended in a minor portion of the pyridine, and the second phase comprising a major portion of the pyridine containing dissolved lower melting wax, oil, and color bodies, separating the phases from one another, and removing the pyridine from each.

References Cited in the file of this patent

UNITED STATES PATENTS

| Number | Name | Date |
|---|---|---|
| 2,017,432 | Bahlke | Oct. 15, 1935 |
| 2,063,369 | Diggs et al. | Dec. 8, 1936 |
| 2,126,493 | McKittrick et al. | Aug. 9, 1938 |
| 2,191,136 | Tijmstra | Feb. 20, 1940 |
| 2,302,434 | Dons et al. | Nov. 17, 1942 |
| 2,561,096 | Clarke | July 17, 1951 |